United States Patent
Kim

[11] Patent Number: 5,949,496
[45] Date of Patent: Sep. 7, 1999

[54] COLOR CORRECTION DEVICE FOR CORRECTING COLOR DISTORTION AND GAMMA CHARACTERISTIC

[75] Inventor: Jin-gu Kim, Suwon, Rep. of Korea

[73] Assignee: Samsung Electronics Co., Ltd., Kyungki-Do, Rep. of Korea

[21] Appl. No.: 08/919,202

[22] Filed: Aug. 28, 1997

[30] Foreign Application Priority Data

Aug. 28, 1996 [KR] Rep. of Korea ................ 96-36136

[51] Int. Cl.⁶ ............................ H04N 9/68; H04N 9/69
[52] U.S. Cl. ...................... 348/645; 348/646; 348/672; 348/675
[58] Field of Search ................................. 348/645, 646, 348/647, 672, 674, 675; 358/518, 519, 522, 523; 382/167, 168; H04N 9/68, 9/69

Primary Examiner—Sherrie Hsia
Attorney, Agent, or Firm—Sughrue, Mion, Zinn, Macpeak & Seas, PLLC

[57] ABSTRACT

A color correction device is disclosed for correcting color distortion in a displayed television image. Internal circuitry of a television receiver has a color signal distortion characteristic, and the cathode ray tube (CRT) in the television receiver has a gamma characteristic according to which display color is distorted. The color correction device includes an average luminance level calculator for calculating the average luminance level of an image signal displayed by the CRT. Based on the average luminance level calculated by the average luminance lever calculator, a selection is made of appropriate sets from a plurality of available sets of coefficient correction values and a plurality of sets of gamma correction values. The color signal input to the television receiver is then corrected according to the selected sets of coefficient correction values and gamma correction values. As a result, the color correction device adaptively changes the coefficient correction values and the gamma correction values according to the calculated average luminance level, thereby providing excellent quality of a picture.

6 Claims, 5 Drawing Sheets

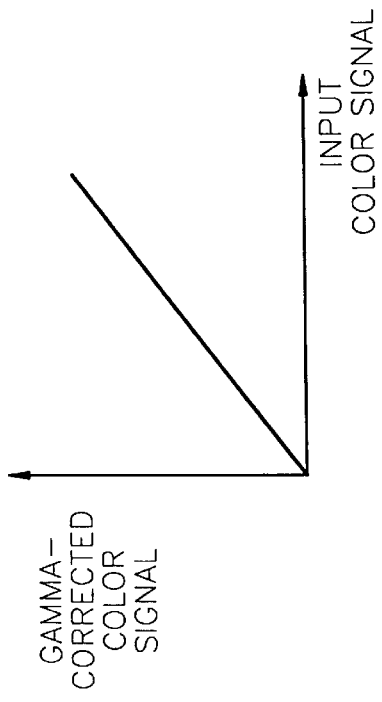
FIG. 2A (PRIOR ART)
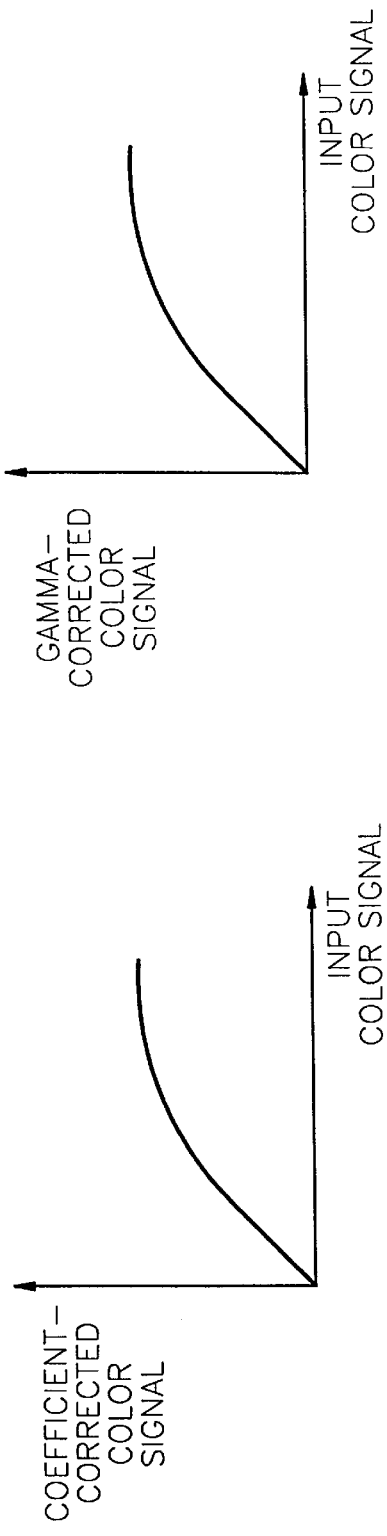
FIG. 2B (PRIOR ART)
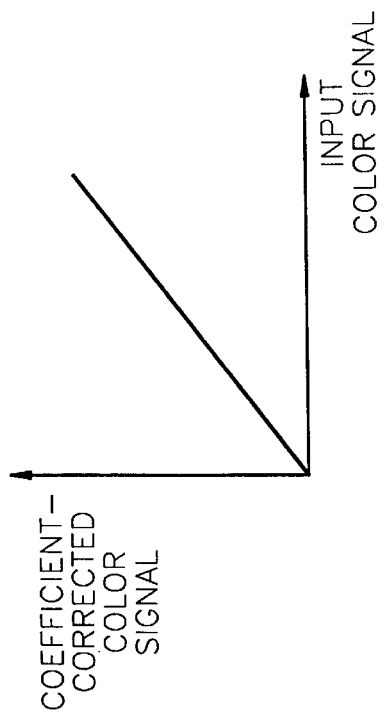
FIG. 3A (PRIOR ART)
FIG. 3B (PRIOR ART)

FIG. 8

| | |
|---|---|
| | COEFFICIENT CORRECTION VALUE #11 |
| | COEFFICIENT CORRECTION VALUE #12 |
| AVERAGE LUMINANCE LEVEL #1 | ⋮ |
| (80) | GAMMA CORRECTION VALUE #11 |
| | GAMMA CORRECTION VALUE #12 |
| | ⋮ |
| | COEFFICIENT CORRECTION VALUE #21 |
| | COEFFICIENT CORRECTION VALUE #22 |
| AVERAGE LUMINANCE LEVEL #2 | ⋮ |
| (82) | GAMMA CORRECTION VALUE #21 |
| | GAMMA CORRECTION VALUE #22 |
| | ⋮ |
| ⋮ | ⋮ |

COLOR CORRECTION DEVICE FOR CORRECTING COLOR DISTORTION AND GAMMA CHARACTERISTIC

BACKGROUND OF THE INVENTION

The present invention relates to a color correction device for correcting distortion in color caused by a color signal distortion characteristic generated by an internal circuit of a receiver and for correcting a gamma characteristic. More particularly, the present invention relates to a color correction device for adaptively correcting the color distortion according to the average luminance level of an input image signal. This application for a color correcting device is based on Korean Patent Application No. 96-36136, which is incorporated by reference herein for all purposes.

In general, a cathode ray tube (CRT) of a color television receiver displays an image whose color is different from the original color of the image transmitted by a broadcasting station. This is due to the color signal distortion characteristic generated by the internal circuits of the receiver and the color reproduction characteristic of the CRT (commonly referred to as the "gamma" characteristic).

In order to solve the above drawback, a conventional color correction device of FIG. 1 corrects the color distortion of an image signal, which is caused by the color signal distortion characteristic generated by an internal circuit of a receiver and by the gamma characteristic. The color correction device of FIG. 1 includes a coefficient correction table 10 for storing a set of coefficient correction values to be used to correct the color signal distortion characteristic of the receiver, as well as a gamma correction table 12 for storing a set of gamma correction values to be used to correct the gamma characteristic. A first operator 14 corrects the level of an input color signal based on the coefficient correction values stored in the coefficient correction table 10, and a second operator 16 corrects the level of the coefficient-corrected color signal output from the first operator 14 based on the gamma correction values stored in the gamma correction table 12. Memory 20 stores a plurality of coefficient correction values (coefficient correction value #1, coefficient correction value #2, . . . ) and a plurality of gamma correction values (gamma correction value #1, gamma correction value #2, . . . ). A color correction controller 18 is provided for selectively outputting one set of coefficient correction values and one set of gamma correction values, each stored in the memory 18, to the coefficient correction table 10 and the gamma correction table 12, respectively, according to the color signal distortion characteristic and the gamma characteristic.

FIGS. 2A and 3A show examples of the color correction using the coefficient correction values stored in the memory 20. Here, the X-axis represents the level of an input color signal, and the Y-axis represents the level of a coefficient-corrected color signal. In FIG. 2A, the level of the color signal is linearly corrected. In FIG. 3A, the level of the color signal is non-linearly corrected. The coefficient correction values stored in the memory 20 are determined depending on the state of the input color signal. Here, the state of the input color signal refers to the distribution state of the input color signal in a chromaticity diagram. The color correction controller 18 compares the distribution state of the input color signal with a desirable color distribution state to select, from the memory 20, a set of coefficient correction values for correcting the deviation obtained through the comparison. Ordinarily, the coefficient correction table 10 provides distinct coefficients for each color signal to separately correct red (R), green (G), and blue (B) color signals.

FIGS. 2B and 3B show examples of color correction using the gamma correction values stored in the memory 20. Here, the X-axis represents the level of an input color signal, and the Y-axis represents the level of a gamma-corrected color signal. As shown in FIG. 2B, the gamma level of the color signal is linearly corrected. FIG. 3B shows gamma level of the color signal as being non-linearly corrected. The gamma correction values stored in the memory 20 are determined according to the gamma characteristics of the CRT. Such gamma characteristics are known a priori based on information provided by a CRT manufacturing company. Ordinarily, the gamma correction table 12 provides distinct gamma correction values for each color signal to separately correct red (R), green (G) and blue (B) color signals.

The color correction controller 18 selectively reads out of the memory 20 a set of coefficient correction values and a set of gamma correction values according to the state of the input color signal and the gamma characteristic of the CRT, and stores the selected values in the coefficient correction table 10 and the gamma correction table 12, respectively.

The conventional color correction device of FIG. 1 can correct the color distortion caused by the color signal distortion characteristic of the internal circuit of the receiver and the gamma characteristic of the CRT. However, the conventional color correction device cannot respond adaptively to the change in the luminance level of an image signal.

For example, when a scene is dark on the whole, increasing the average level of a luminance signal makes contrast high, so that objects in the scene are more noticeable. Meanwhile, a very bright scene can cause eye strain. However, this eye strain can be reduced by lowering the average level of the luminance signal.

Thus, in a color correction device, it is desirable to perform the color correction adaptively according to the average level of the luminance signal.

SUMMARY OF THE INVENTION

It is an object of the present invention to provide a color correction device capable of adaptively correcting color distortion according to the average luminance level of an input image signal.

It is another object of the present invention to provide a color correction device capable of enhancing the quality of an image displayed by a cathode ray tube (CRT).

To achieve the objects, there is provided a color correction device for correcting color distortion caused by a color signal distortion characteristic of an internal circuit of a receiver, and by a gamma characteristic of a cathode ray tube (CRT). The color correction device comprises a coefficient correction table for storing a set of coefficient correction values for correcting the color signal distortion characteristic and a gamma correction table for storing a set of gamma correction values for correcting the gamma characteristic. A first operator corrects the level of an input color signal based on the coefficient correction values stored in the coefficient correction table, and a second operator corrects the level of the coefficient-corrected color signal output from the first operator based on the gamma correction values stored in the gamma correction table to send the corrected value to the CRT. A memory is provided for storing a plurality of coefficient correction values and a plurality of gamma correction values which are set for each of several average luminance levels. An average luminance level calculator calculates the average luminance level of the color signal displayed by the CRT. A color correction controller selects one set of the coefficient correction values and one set of the gamma correction values stored in the memory based on the average luminance level calculated by the average luminance level calculator, the state of the input color signal, and the gamma characteristic of the CRT.

Preferably, in the color correction device according to the present invention, the average luminance level calculator includes a histogram extractor, a dispersion calculator, and a maximum dispersion detector. The histogram extractor extracts from the image signal displayed on the CRT a histogram corresponding to the luminance level of the image signal. The dispersion calculator calculates dispersions for each of luminance levels from the histogram extracted by the histogram extractor. The maximum dispersion detector detects the dispersion having the maximum value among the dispersions calculated by the dispersion calculator to provide to the color correction controller the detected maximum dispersion as the average luminance level.

BRIEF DESCRIPTION OF THE DRAWINGS

The above objects and advantages of the present invention will become more apparent by describing in detail a preferred embodiment thereof with reference to the attached drawings in which:

FIGS. 2A and 3A show examples of the coefficient correction characteristics of the color correction device of FIG. 1;

FIGS. 2B and 3B show examples of the gamma correction characteristics of the color correction device of FIG. 1;

FIG. 8 shows the mapping state of the memory of FIG. 4.

DETAILED DESCRIPTION OF THE INVENTION

Figure 1:
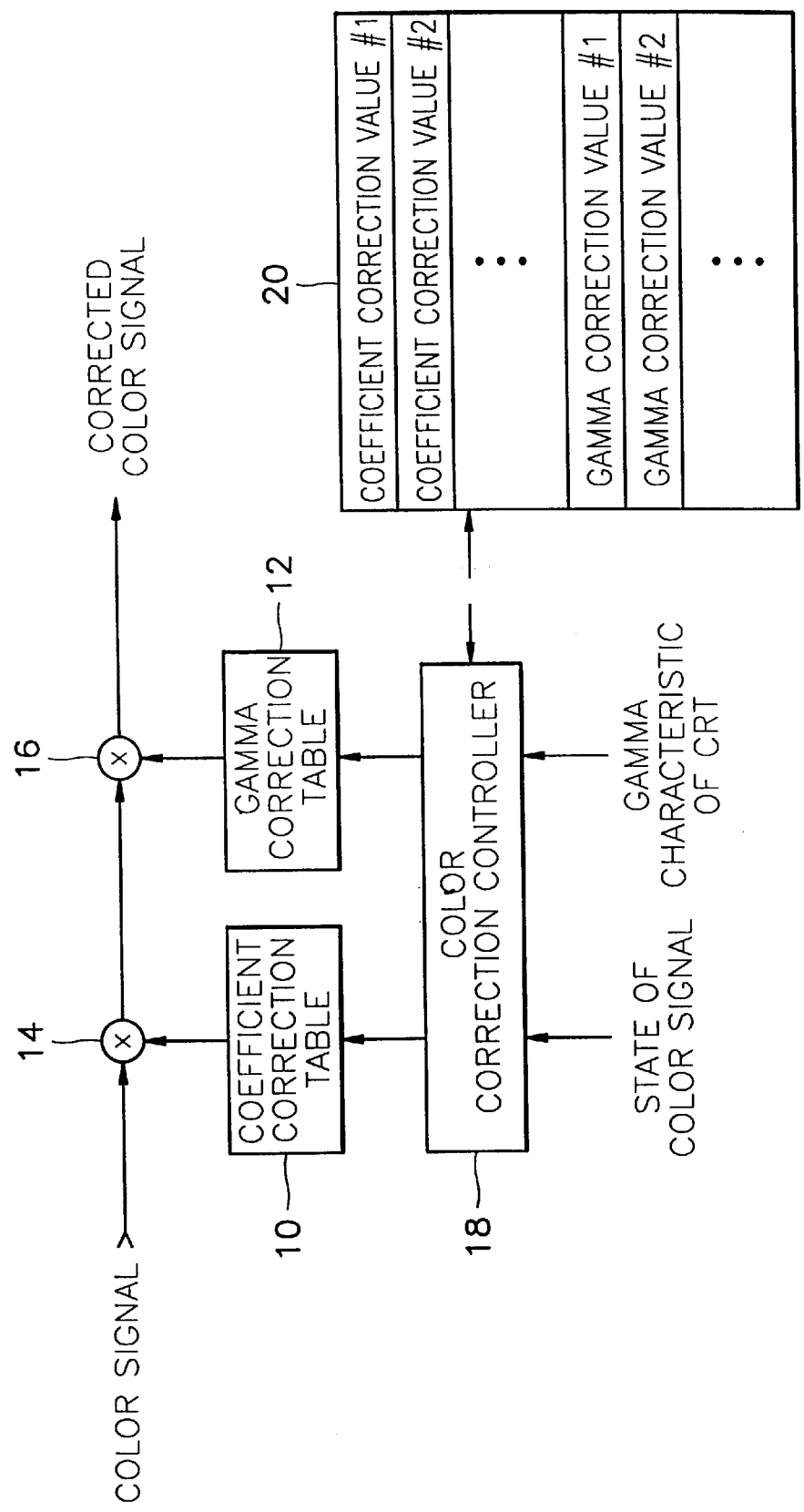
FIG. 1 is a block diagram of a conventional color correction device.
Figure 4:
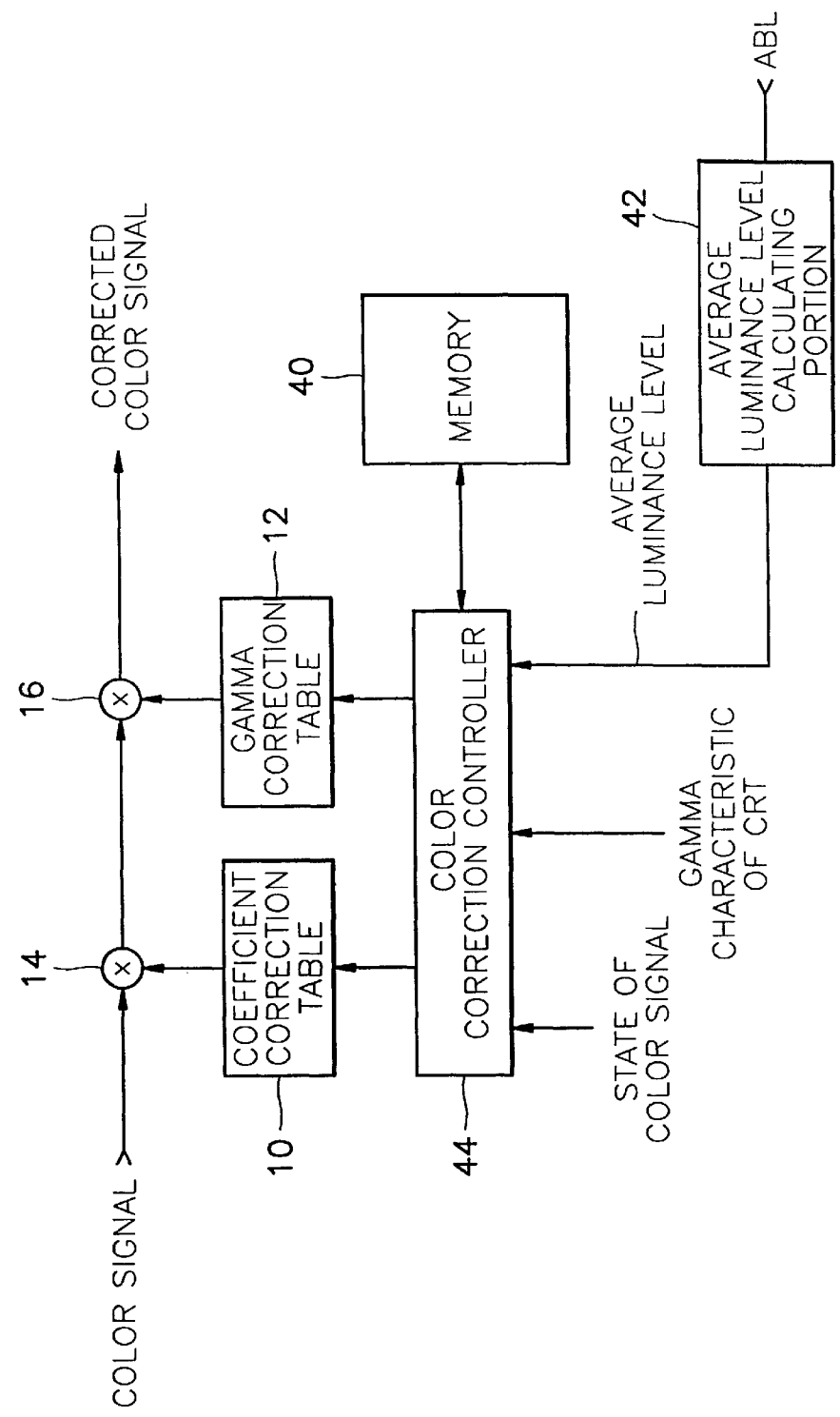
FIG. 4 is a block diagram of a color correction device according to the present invention.

FIG. 4 shows the structure of a color correction device according to the present invention. Those elements of FIG. 4 which are similar to those of FIG. 1 are denoted by the same reference numerals as those used in FIG. 1. As the like numbered elements are similar to those of FIG. 1, explanation of such elements will be omitted as redundant. Reference numeral 40 represents a memory for storing coefficient correction value sets and gamma correction value sets which correspond to each of several luminance levels. Reference numeral 42 represents an average luminance level calculating portion. Reference numeral 44 represents a color correction controller for selectively outputting a set of coefficient correction values and a set of gamma correction values stored in the memory 40 to a coefficient correction table 10 and a gamma correction table 12, respectively, according to the average luminance level, the state of an input color signal, and the gamma characteristics of a cathode ray tube (CRT).

The color correction device of FIG. 4 adaptively corrects the color signal by using different coefficient correction values and different gamma correction values according to the average luminance level (calculated by the average luminance level calculating portion 42), the state of the input color signal, and the gamma characteristics of the CRT.

The average luminance level calculator 42 calculates the average level of a luminance signal displayed by a CRT (not shown). To this end, the average luminance level calculator 42 uses an automatic brightness level (ABL) signal which is fed back from the CRT. Here, the ABL signal is a signal obtained by feeding back the output level of a member for driving the luminance signal.

Figure 5:
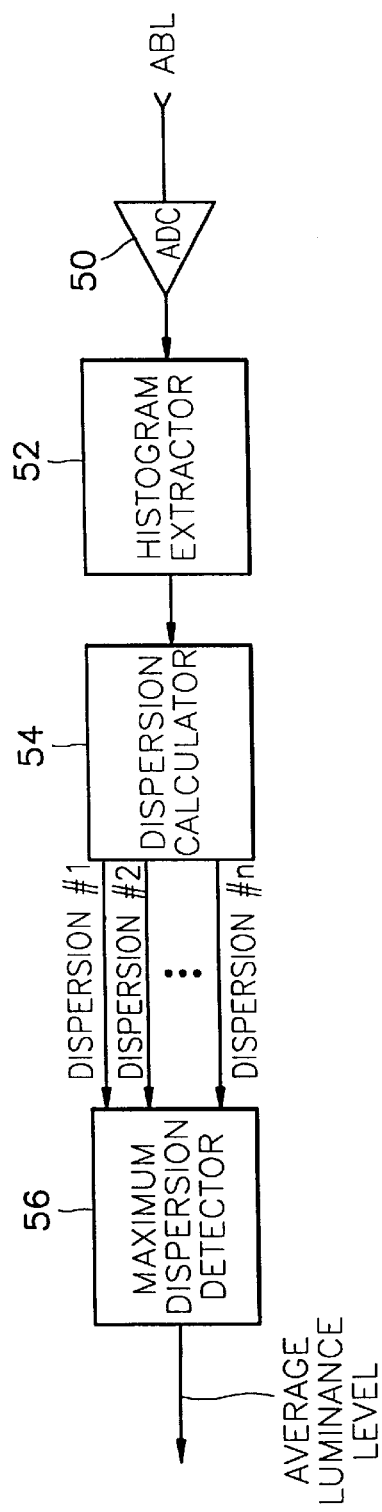
FIG. 5 is a detailed block diagram of the average luminance level calculating portion of FIG. 4.

FIG. 5 is a detailed block diagram of the average luminance level calculator 42 of FIG. 4.

The average luminance level calculator 42 of FIG. 5 includes an analog-to-digital converter (ADC) 50 for outputting the digitized ABL signal, and a histogram extractor 52 for extracting a histogram from the digitized ABL signal. A dispersion calculator 54 calculates dispersions (dispersion #1, dispersion #2, . . . , dispersion #n) by luminance level from the extracted histogram, and a maximum dispersion detector 56 detects the dispersion having the maximum value among the calculated dispersions to output the detected maximum dispersion as the average luminance level signal. Preferably, the average luminance level calculator of FIG. 5 calculates the average luminance level for each frame.

Figure 7:
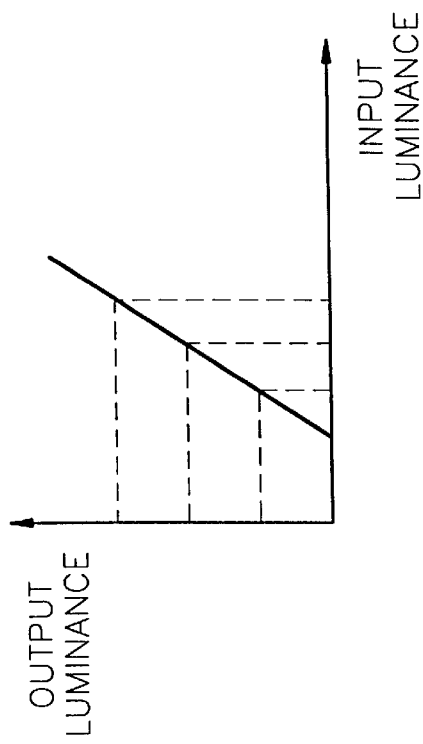
FIG. 7 shows an example of luminance transform characteristics.
Figure 6:
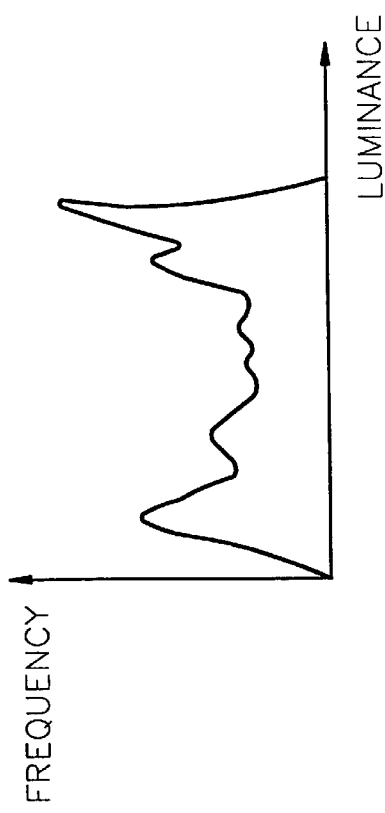
FIG. 6 shows an example of a histogram prepared by the histogram extractor of FIG. 5.

The histogram refers to a graph in which the luminance distribution of a target image is expressed as frequencies of occurrence for each luminance level. To aid in the understanding of the luminance distribution, the graph shown in FIG. 6 illustrates an example of a luminance distribution (or, histogram). If the histogram of the input image leans to a side, a picture having high contrast can be obtained by applying a luminance transform to uniformly distribute the luminance. That is, luminance values to be output, corresponding to the luminance values of the input image, are determined according to a given luminance transform characteristic. The transform characteristic is determined by a characteristic curve which represents a correspondence of the output luminance of the Y-axis to the input luminance of the X-axis in a 2-dimensional plane as shown in FIG. 7.

In the color correction device according to the present invention, the characteristic curve is determined based on the luminance level having the maximum dispersion, i.e., the average luminance level. After the average luminance level is determined, for example, if the average luminance level is lower than a given reference value, a characteristic curve is determined such that a low luminance level is emphasized while a high luminance level is mitigated. Conversely, if the determined average luminance level is higher than the given reference value, a characteristic curve is determined such that the low luminance level and the high luminance level are both mitigated. After the characteristic curve is determined, the coefficient correction values and the gamma correction values are determined.

FIG. 8 shows the mapping state of the memory 40. The memory 40 stores the coefficient correction values and gamma correction values according to the average luminance levels. As shown in FIG. 8, a first region 80 stores coefficient correction values (coefficient correction value #11, coefficient correction value #12, . . . ) and gamma correction values (gamma correction value #11, gamma correction value #12, . . . ) which correspond to a first average luminance level (average luminance level #1). A second region 82 stores coefficient correction values (coefficient correction value #21, coefficient correction value #22, . . . ) and gamma correction values (gamma correction value #21, gamma correction value #22, . . . ) which correspond to a second average luminance level (average luminance level #2). The memory map of memory 40 has several such regions, each containing sets of coefficient correction values and gamma correction values corresponding to different average luminance levels. The coefficient correction values and the gamma correction values stored in each region are different according to the average luminance level, the state of an input color signal, and the gamma characteristic of a CRT.

The color correction controller 44 of FIG. 4 selects one set of the coefficient correction values and one set of the gamma correction values stored in the memory 40 based on the average luminance level calculated by the average luminance level calculator 42, the state of an input color signal, and the gamma characteristic of a CRT. The color correction controller then outputs the selected sets of the correction values to the coefficient correction table 10 and the gamma correction table 12, respectively.

Thus, the color correction device of FIG. 4 adaptively performs the color correction by changing the coefficient correction values and the gamma correction values according to the average luminance level of the image signal displayed by a CRT. Preferably, the coefficient correction table 10 and the gamma correction table 12 are updated by the color correction controller 44 during a vertical blanking interval of the image signal.

As described above, the color correction device according to the present invention adaptively corrects the color distortion according to the average luminance level of the image signal displayed on the CRT, thus enhancing quality of a picture.

The present invention has been described with reference to a preferred embodiment. However, it will be appreciated that various modifications may be made to the described embodiment without departing from the spirit and scope of the present invention.

What is claimed is:

1. A color correction device for correcting color distortion in a television receiver, the color distortion being caused by internal circuitry of the receiver which has a color signal distortion characteristic, and caused a cathode ray tube (CRT) of the receiver which has a gamma characteristic, the color correction device comprising:

a coefficient correction table for storing a set of coefficient correction values for correcting the color signal distortion characteristic;

a gamma correction table for storing a set of gamma correction values for correcting the gamma characteristic;

a first operator for correcting the level of an input color signal according to the coefficient correction values stored in said coefficient correction table, to output a coefficient-corrected color signal;

a second operator for correcting the level of the coefficient-corrected color signal according to the gamma correction values stored in said gamma correction table, to output a corrected color signal value to the CRT;

a memory for storing a plurality of sets of coefficient correction values and a plurality of sets of gamma correction values, wherein each of the sets of coefficient correction values and each of the sets of gamma correction values correspond to a particular average luminance level of a color signal displayed by the CRT;

an average luminance level calculator which receives the color signal displayed by said CRT as an input, and which outputs an average luminance level calculated based on the color signal displayed by said CRT; and a color correction controller for selecting one set of said plurality of sets of coefficient correction values stored in said memory, and for selecting one set of said plurality of sets of the gamma correction values stored in said memory, wherein selection of the coefficient correction value and the gamma correction value sets is based on the average luminance level output by said average luminance level calculator, a state of the input color signal, and the gamma characteristic of said CRT, to provide the selected coefficient correction value set to said coefficient correction table and the selected gamma correction value set to said gamma correction table.

2. The color correction device of claim 1, wherein said average luminance level calculator comprises:

a histogram extractor for extracting a histogram corresponding to luminance levels of an image signal displayed by the CRT;

a dispersion calculator for calculating dispersions for each of luminance levels from the histogram extracted by said histogram extractor; and a maximum dispersion detector for detecting the dispersion having a maximum value among the dispersions calculated by said dispersion calculator to provide a detected maximum dispersion to said color correction controller as the average luminance level.

3. The color correction device of claim 1, wherein the state of the input color signal is a distribution state of the input color signal in a chromaticity diagram.

4. The color correction device of claim 1, wherein the average luminance level is calculated by said average luminance level calculator for each frame of said input color signal.

5. The color correction device of claim 4, wherein color correction controller provides updated selections of a coefficient correction value set to said coefficient correction table and a gamma correction value set to said gamma correction table for each frame of said input color signal.

6. The color correction device of claim 5, wherein updating by said color correction controller is provided during a vertical blanking period of said input color signal.

* * * * *